(12) United States Patent
Kimura et al.

(10) Patent No.: US 10,885,656 B2
(45) Date of Patent: Jan. 5, 2021

(54) IMAGE PROCESSING DEVICE AND METHOD

(71) Applicants: Sony Corporation, Tokyo (JP); Sony Interactive Entertainment Inc., Tokyo (JP)

(72) Inventors: Atsushi Kimura, Tokyo (JP); Daisuke Tahara, Tokyo (JP); Hiroyuki Segawa, Kanagawa (JP); Tetsugo Inada, Kanagawa (JP); Akio Ohba, Kanagawa (JP); Hirofumi Okamoto, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 289 days.

(21) Appl. No.: 15/772,935

(22) PCT Filed: Sep. 29, 2016

(86) PCT No.: PCT/JP2016/078849
§ 371 (c)(1),
(2) Date: May 2, 2018

(87) PCT Pub. No.: WO2017/086032
PCT Pub. Date: May 26, 2017

(65) Prior Publication Data
US 2018/0322651 A1    Nov. 8, 2018

(30) Foreign Application Priority Data
Nov. 20, 2015 (JP) .................................. 2015-227611

(51) Int. Cl.
*G06T 7/70* (2017.01)
*G06T 7/60* (2017.01)
(Continued)

(52) U.S. Cl.
CPC ............ *G06T 7/70* (2017.01); *G06K 9/00369* (2013.01); *G06T 7/60* (2013.01); *G06T 7/75* (2017.01); *G06T 2207/30196* (2013.01)

(58) Field of Classification Search
CPC .... G06T 7/70; G06T 7/75; G06T 7/60; G06T 2207/30196; G06K 9/00; G06K 9/00369
See application file for complete search history.

(56) References Cited

U.S. PATENT DOCUMENTS 8,013,852 B2 * 9/2011 Ng-Thow-Hing ..........................
G06K 9/00369
345/419
8,135,209 B2 * 3/2012 Ikeda ........................ G06T 7/75
382/103
(Continued)

FOREIGN PATENT DOCUMENTS

JP    2004239728 A    8/2004
JP    200865368 A     3/2008
(Continued)

OTHER PUBLICATIONS

Chun-Hao Huang et al., "Robust Human Body Shape and Pose Tracking," 2013 International Conference on 3D Vision, Jun. 2013 (Jun. 2013), pp. 287-294, XP055563629.
(Continued)

*Primary Examiner* — Anand P Bhatnagar
(74) *Attorney, Agent, or Firm* — Michael Best & Friedrich LLP (57) ABSTRACT

[Object] To perform more stable and highly accurate attitude estimation.
[Solution] The attitude optimization unit optimizes the articulation position, the angle, the number of articulations, and the like which are attitude parameters of a human body model (tree structure) by a plurality of optimization techniques so as to match a region in which a human body can
(Continued)

exist, and switches among a plurality of optimization techniques and uses an optimum technique. Note that optimization techniques include 1. initial value, 2. algorithm, and 3. restriction, and optimization is performed by switching among these three. For example, it is possible to apply the present disclosure to an image processing device that performs image processing of optimizing the articulation position and angle of a human body model.

14 Claims, 6 Drawing Sheets

(51) Int. Cl.
*G06T 7/73* (2017.01)
*G06K 9/00* (2006.01)

(56) References Cited

U.S. PATENT DOCUMENTS

| | | | |
|---|---|---|---|
| 8,355,529 B2 | 1/2013 | Wu et al. | |
| 9,117,113 B2* | 8/2015 | Popa | G06K 9/00342 |
| 9,355,305 B2* | 5/2016 | Tanabiki | G06T 7/75 |
| 9,633,268 B1* | 4/2017 | Ma | G06K 9/00342 |
| 9,710,964 B2* | 7/2017 | Loper | G06T 17/10 |
| 2008/0112592 A1 | 5/2008 | Wu et al. | |
| 2009/0080780 A1 | 3/2009 | Ikeda | |
| 2013/0230211 A1* | 9/2013 | Tanabiki | G06K 9/00342 382/103 |
| 2014/0219550 A1* | 8/2014 | Popa | G06K 9/00342 382/154 |
| 2016/0086025 A1* | 3/2016 | Shotton | G06K 9/00369 382/103 |
| 2017/0004657 A1* | 1/2017 | Zagel | G06K 9/00369 |
| 2017/0287213 A1* | 10/2017 | Loper | G06T 17/10 |
| 2018/0182166 A1* | 6/2018 | Shen | G06T 19/20 |
| 2018/0322651 A1* | 11/2018 | Kimura | G06T 7/70 |

FOREIGN PATENT DOCUMENTS

| | | |
|---|---|---|
| JP | 2014200015 A | 10/2014 |
| WO | 2007010893 A1 | 1/2009 |
| WO | 2012046392 A1 | 2/2014 |

OTHER PUBLICATIONS

Yoel Tenne, "An Optimization Algorithm Employing Multiple Metamodels and Optimizers", International Journal of Automation and Computing, vol. 10, No. 3, Jun. 2013 (Jun. 2013), pp. 227-241, XP055574843.
Extended European Search Report dated Apr. 5, 2019, for corresponding European Patent Application No. 16866034.8-1210.
"Articulated Body Motion Capture by Stochastic Search", Deutscher et al., International Journal of Computer Vision, 2005, Department of Engineering Science, University of Oxford, Oxford, OX13PJ, United Kingdom, Aug. 19, 2003.
"A Markerless Motion Capture System to Study Musculoskeletal Biomechanics: Visual Hull and Simulated Annealing Approach", Corazza et al., Annals of Biiomedical Engineering—Ann Biomed Eng, vol. 34, No. 6, pp. 1019-1029, 2006.
International Search Report for application No. PCT/JP2016/078849 dated Nov. 4, 2016.

* cited by examiner

IMAGE PROCESSING DEVICE AND METHOD

TECHNICAL FIELD

The present disclosure relates to an image processing device and a method, and more particularly relates to an image processing device and a method that can perform more stable and highly accurate attitude estimation.

BACKGROUND ART

There is an attitude estimation technology (for example, see Non-Patent Literature 1) of, with respect to an input image from a camera or the like, applying a human body model by energy optimization to a silhouette region of a moving subject portion by a background subtraction algorithm or the like to estimate an attitude.

In addition, there is also a technology (for example, see Non-Patent Literature 2) of using a technique called Visual Hull of projecting silhouettes of a plurality of moving subject portions three-dimensionally and estimating three-dimensional shapes representing the human body portions, and then performing optimization of human body models.

CITATION LIST

Non-Patent Literature

Non-Patent Literature 1: <Articulated Body Motion Capture by Stochastic Search (International Journal of Computer Vision, 2005), JONATHAN DEUTSCHER AND LAN REID, Department of Engineering Science, University of Oxford, Oxford, OX13PJ, United Kingdom, Received Aug. 19, 2003.>

Non-Patent Literature 2: <Markerless Motion Capture System to Study Musculockeletal Biomechanics, Visual Hull and Simulated Annealing Approach, S. Corazza, L. Mundermann, A. M. Chaudhari, T. Demattio, C. Cobelli, T. P. Andriacchi, Annals of Biomedical Engineering—ANN BIOMED ENG, vol. 34, no. 6, pp. 1019-1029, 2006>

DISCLOSURE OF INVENTION

Technical Problem

These technologies both result in an energy function optimization problem, but it is generally difficult for the optimization problem to ensure a global optimal solution, and there is a fear to fall into a local optimal solution. If a high-quality initial value is utilized, a global optimal solution can be obtained stably, but it is generally difficult to obtain such an initial value.

Therefore, it has been difficult up to now to continue estimating a correct attitude stably.

The present disclosure was made in view of such circumstances, and can perform more stable and highly accurate attitude estimation.

Solution to Problem

According to an aspect of the present technology, an image processing device includes: a first attitude optimization unit configured to, with respect to a human body region extracted from an input image, optimize an attitude parameter of a human body model by using a first optimization technique; a second attitude optimization unit configured to, with respect to the human body region, optimize the attitude parameter of the human body model by using a second optimization technique different from the first optimization technique; and a selection unit configured to select one of a first optimization result obtained by the first optimization technique and a second optimization result obtained by the second optimization technique.

The image processing device may further include an object detection unit configured to detect an object from the input image. The selection unit may select one of the first optimization result and the second optimization result in accordance with an object detection result obtained by the object detection unit.

The image processing device may further include a degree-of-reliability evaluation unit configured to evaluate a degree of reliability of the first optimization result and a degree of reliability of the second optimization result. The selection unit may select one of the first optimization result and the second optimization result in accordance with a degree-of-reliability evaluation result obtained by the degree-of-reliability evaluation unit.

In a case where the degrees of reliability of both of the optimization results are lower than a threshold value, the selection unit may select an attitude parameter in an initial state.

In a case where the degrees of reliability of both of the optimization results are lower than a threshold value, the selection unit may suspend processing using the first optimization technique and the second optimization technique, and prompt a user to perform calibration.

The first optimization technique and the second optimization technique relate to at least one of an algorithm, an initial value, and a restriction condition.

One of the first optimization technique and the second optimization technique is a technique based on an extremum seeking algorithm.

One of the first optimization technique and the second optimization technique is a technique based on a specific attitude or a specific action.

The image processing device further includes an object detection unit configured to detect an object from the input image. One of the first optimization technique and the second optimization technique performs optimization using an optimization result in a previous frame as an initial value, and the other of the first optimization technique and the second optimization technique performs optimization using an initial value determined on a basis of an object detection result obtained by the object detection unit.

The image processing device further includes an object detection unit configured to detect an object from the input image. One of the first optimization technique and the second optimization technique performs optimization using a restriction determined on a basis of an object detection result obtained by the object detection unit.

The attitude parameter of the human body model includes an articulation position, an angle, and a number of articulations.

According to an aspect of the present technology, an image processing image method includes, by a processing device: optimizing an attitude parameter of a human body model by using a first optimization technique, with respect to a human body region extracted from an input image; optimizing the attitude parameter of the human body model by using a second optimization technique different from the first optimization technique, with respect to the human body region; and selecting one of a first optimization result obtained by the first optimization technique and a second optimization result obtained by the second optimization technique.

According to an aspect of the present technology: an attitude parameter of a human body model is optimized by using a first optimization technique, with respect to a human body region extracted from an input image; the attitude parameter of the human body model is optimized by using a second optimization technique different from the first optimization technique, with respect to the human body region; and one of a first optimization result obtained by the first optimization technique and a second optimization result obtained by the second optimization technique is selected.

Advantageous Effects of Invention

According to the present technology, it is possible to perform more stable and highly accurate attitude estimation.

Note that the effects described in the present specification are merely illustrative, and the effects of the present technology are not limited to the effects described in the present specification, but there may be additional effects.

MODE(S) FOR CARRYING OUT THE INVENTION

A mode (hereinafter referred to as an embodiment) for carrying out the present disclosure will be described below.
<Configuration Example of Image Processing Device>

Figure 1:
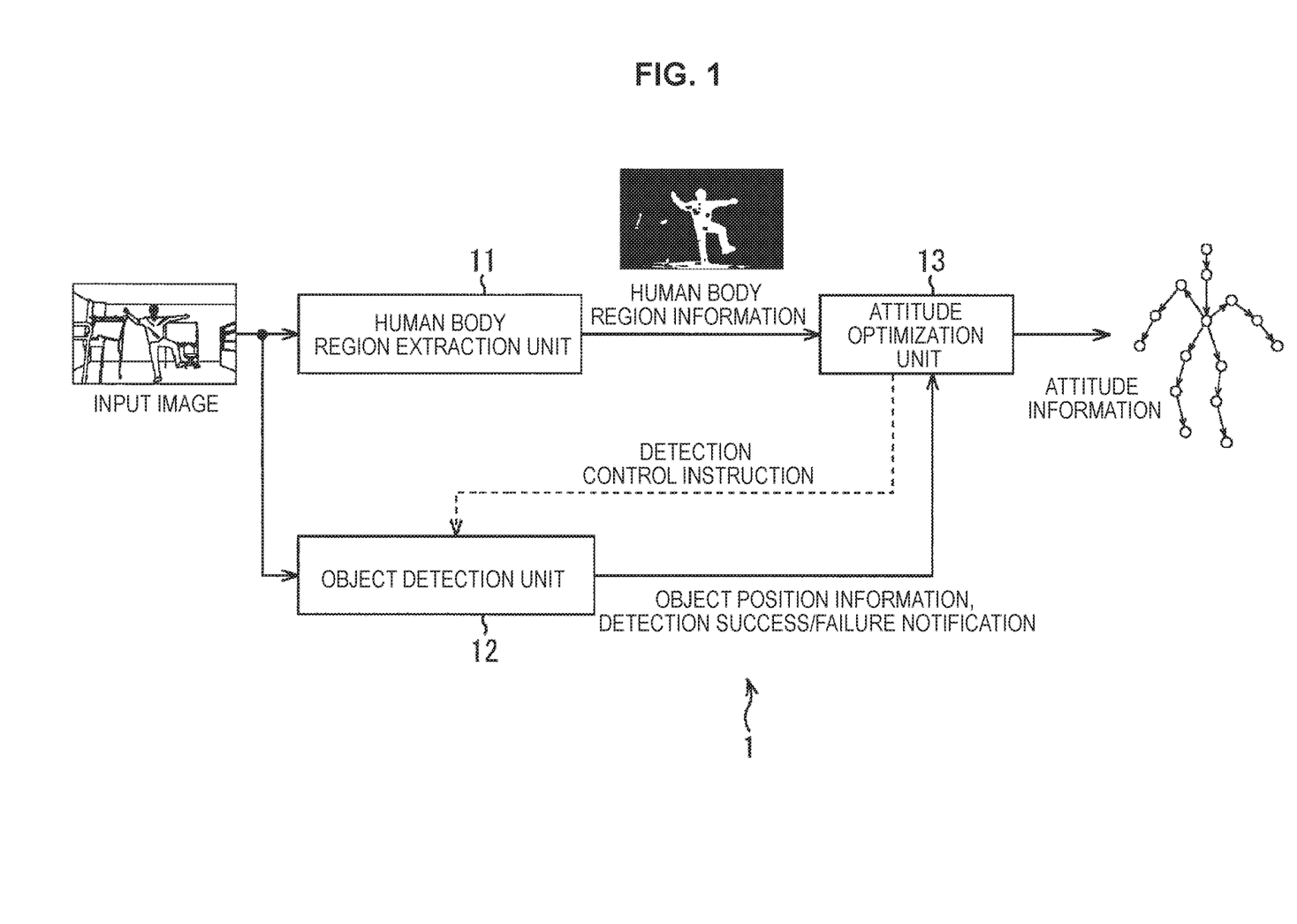
FIG. 1 is a block diagram showing a configuration example of an image processing device to which the present technology has been applied.

FIG. 1 is a diagram showing a configuration example of an image processing device to which the present technology has been applied. The example of FIG. 1 is an image processing device that performs image processing of extracting a region that looks like a human body from an input image from a camera or the like, and optimizing the articulation position and angle of a human body model so as to match the extracted region that looks like a human body.

In the example of FIG. 1, an image processing device 1 includes a human body region extraction unit 11, an object detection unit 12, and an attitude optimization unit 13. Note that an image is input from the outside not shown to the human body region extraction unit 11 and the object detection unit 12 as an input image.

The human body region extraction unit 11 extracts a spatial region in which a human body which is a target of authentication can exist from the input image. For example, a region that looks like a human body is extracted from the input image using the background subtraction algorithm, and human body region information is generated and output to the attitude optimization unit 13.

The object detection unit 12 performs detection and position specification on the input image only for a specific object or use environment. For example, the object detection unit 12 detects any one or more of an individual part of a human body (for example, face detection, hand detection, or the like), a marker (for example, a mark for position tracking put on the body, or the like), and a specific object (for example, a game controller or a racket, bat, or the like used in sport), and outputs the position.

Note that, in a case where detection has failed, the attitude optimization unit 13 is notified of the failure. In addition, not only an image but also sensing information (an infrared sensor, laser positioning, or the like) may be used.

The attitude optimization unit 13 switches among a plurality of optimization techniques and uses an optimum technique in accordance with an object detection result. In addition, the attitude optimization unit 13 optimizes the articulation position, the angle, the number of articulations, and the like which are attitude parameters of a human body model (tree structure) by a plurality of optimization techniques so as to match a region in which a human body can exist, and switches among a plurality of optimization techniques and uses an optimum technique. For example, in the attitude optimization unit 13, optimization is performed such that the silhouette of the human body model conforms to the human body region information obtained from an input image, as shown in FIG. 2.

Figure 2:
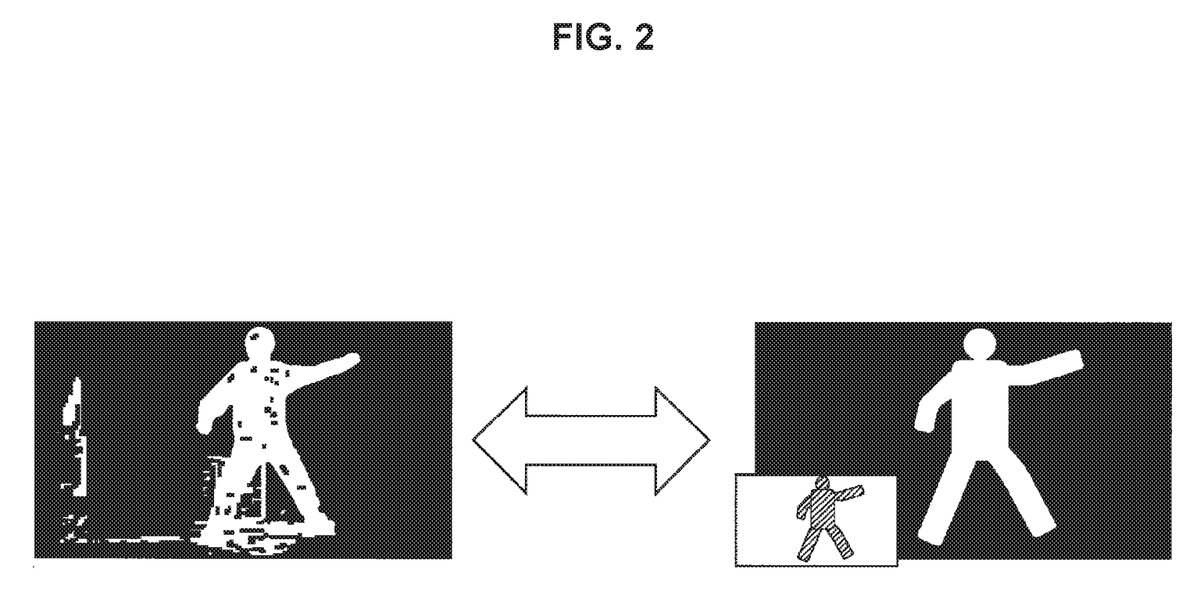
FIG. 2 is a diagram describing a comparison between human body region information and a human body model.

In the example of FIG. 2, the human body region information obtained from the input image is shown on the left side, and the silhouette of the human body model is shown on the right side.

On that occasion, using the degree of conformity (for example, the sum of absolute difference values) as energy, attitude parameters (the articulation position, the angle, and the number of articulations), and the like are optimized such that the energy is minimized. Note that optimization techniques include 1. initial value, 2. algorithm, and 3. restriction, and optimization is performed by switching among these three.

In addition, the attitude optimization unit 13 causes the object detection unit 12 to only perform a necessary operation using a detection control instruction in accordance with the optimization result.

Note that, in the example of FIG. 1, since the object detection unit 12 generally has a large throughput, it is configured to cause the object detection unit 12 to only perform a necessary operation using the detection control instruction, whilst the object detection unit 12 may be caused to operate constantly at all times without issuing the detection control instruction. In addition, presence and absence of the object detection unit 12 may be switched upon receiving a control instruction from the outside, or may be caused to operate at all times.

Figure 3:
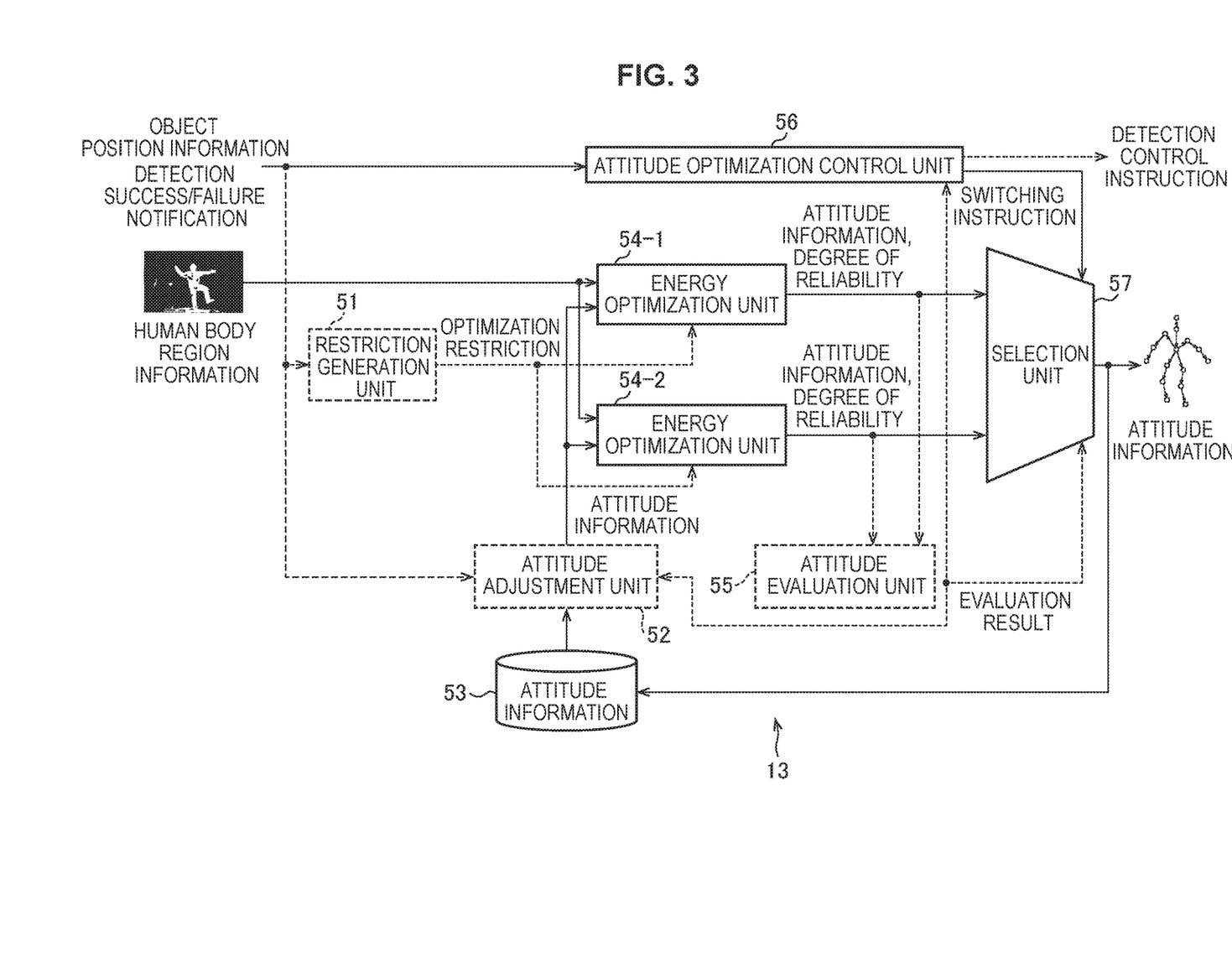
FIG. 3 is a block diagram showing a configuration example of an attitude optimization unit of FIG. 1.

FIG. 3 is a block diagram showing a detailed configuration example of the attitude optimization unit 13.

The example of FIG. 3 includes a restriction generation unit 51, an attitude adjustment unit 52, an attitude information storage unit 53, energy optimization units 54-1 and 54-2, an attitude evaluation unit 55, an attitude optimization control unit 56, and a selection unit 57.

Human body region information from the human body region extraction unit 11 is input to the energy optimization units 54-1 and 54-2. Object position information and a detection success/failure notification which are object detection results from the object detection unit 12 are input to the restriction generation unit 51, the attitude adjustment unit 52, and the attitude optimization control unit 56.

The restriction generation unit 51 generates an "optimization restriction" for imposing a restriction condition on optimization in accordance with the object detection results from the object detection unit 12. For example, in a case where the face position can be specified by face detection in the object detection unit 12, the restriction generation unit 51 generates an optimization restriction (condition) that limits a variable space that attitude parameters may take to a "partial space in which the face position conforms to a detection result", and outputs the generated optimization restriction to the energy optimization units 54-1 and 54-2.

The attitude adjustment unit 52 adjusts attitude information (attitude parameters) to be used as an input initial value of optimization in accordance with the object detection result or the attitude evaluation result obtained at a previous time. For example, as an example of the object detection result, in a case where the face position has been identified by face detection, the attitude parameters are adjusted so as to conform to the position of the detection result.

In addition, as an example of the attitude evaluation result obtained at a previous time, in a case where reliability of the optimization result has decreased, an attitude to be used as an input for next optimization is set again at a specific posture (for example, an upright attitude with open arms).

In the example of FIG. 3, attitude information to be an output is used as an input initial value of optimization at a next time for temporal motion continuity and ease of optimization processing, whilst in a case where an incorrect attitude is obtained as a result of optimization, the influence could continue to the next time and later. Thus, by setting (adjusting) again at a specific posture, it is possible to reset temporal continuity.

As another remedy in a case where reliability has decreased as a result of optimization, it is also possible to achieve a system configuration that prompts a user for human body calibration through use of a prescribed attitude using a display unit, a speaker, or the like, neither shown, for example, to bring a return such that correct attitude estimation can be performed again.

The attitude information storage unit 53 stores attitude information of the optimization result obtained at a previous time, and supplies the attitude information to the attitude adjustment unit 52.

The energy optimization units 54-1 and 54-2 each perform optimization of a parameter for determining an attitude by inputting human body region information and attitude information for giving an initial value of optimization, and output resultant optimized attitude information and a degree of reliability to the attitude optimization control unit 56 and the selection unit 57.

Here, the degree of reliability is a value for evaluating how well the attitude applies as a result of optimization, and the degree of reliability shall refer to the final degree of energy of optimization to be minimized, for example.

The energy optimization units 54-1 and 54-2 are different from each other in optimization method and property. For example, the energy optimization unit 54-1 has a configuration according to an extremum seeking algorithm such as the gradient method, for example, and the energy optimization unit 54-2 has a configuration according to another algorithm such as a discrete search of a solution space (a full search for a determination pattern, that is, inputting approximately 1000 attitude patterns that human beings are likely to take with the face position being fixed without taking a function value, and subjecting them to a full search). In addition, alternatively, the energy optimization unit 54-1 has a configuration capable of performing general-purpose attitude optimization, and the energy optimization unit 54-2 has a configuration capable of performing optimization specially designed for a specific attitude (for example, a golf swing or baseball form). The configuration of the energy optimization unit 54-2 is suitable when the configuration of the energy optimization unit 54-1 (gradient method) or the like brings about a local minimum, or the like.

That is, assuming that the energy optimization unit 54-1 uses an algorithm of the gradient method, another algorithm that the energy optimization unit 54-2 uses in contrast includes a probabilistic optimization algorithm, and the probabilistic optimization algorithm includes a genetic algorithm, simulated annealing, and others. The others include, as approaches through use of knowledge, an algorithm using an attitude information database and an algorithm considering a representative attitude, and as full-search approaches, an algorithm that subjects a parameter space to a full search sparsely and an algorithm that performs a quasi-full search sequentially for each part of the head, body trunk, hand, and the like.

In addition, as a variation, the energy optimization units 54-1 and 54-2 receive the optimization restriction from the restriction generation unit 51 as an input. For example, the energy optimization units 54-1 and 54-2 impose a restriction on attitude parameters using object position information obtained by object detection, and perform optimization. For example, in a case where the position of a person can be specified by human detection, optimization is performed limiting a variable space that the attitude parameters may take to a partial space in which the position of the person conforms to a detection result.

The attitude evaluation unit 55 evaluates whether the optimization results obtained by the energy optimization units 54-1 and 54-2 are reliable, and outputs an evaluation result to the attitude adjustment unit 52, the attitude optimization control unit 56, and the selection unit 57. Briefly, the attitude evaluation unit 55 compares the degrees of reliability output from the energy optimization units 54-1 and 54-2 with a fixed threshold value to determine whether or not the optimization results are reliable.

Other evaluation methods further include a method of comparing the optimization results obtained by the energy optimization units 54-1 and 54-2 and outputting the results in combination, a method in which the attitude evaluation unit 55 internally holds degrees of reliability obtained in the past, and in a case where a new degree of reliability varies significantly from the past degrees, it is determined that optimization is incorrect, and a method in which, if optimized attitude information is unnatural for a human body attitude or a change in movement, it is determined that optimization is incorrect. Note that only one of these methods may be employed, or these methods may be employed in combination.

The attitude optimization control unit 56 has a function of receiving an object detection result and switching either energy optimization (for example, optimization of the gradient method), and outputs a switching instruction to the selection unit 57. In addition, the attitude optimization control unit 56 outputs, as a variation, a detection control instruction that controls whether or not to cause object detection processing to operate at a next time (frame) to the object detection unit 12.

In addition, the attitude optimization control unit 56 may receive the evaluation result from the attitude evaluation unit 55 to switch the detection control instruction. Specifically, the attitude optimization control unit 56 exerts such control of, when the optimization result is sufficiently reliable, not performing object detection, and only when reliability has decreased, performing object detection.

The selection unit 57 selects between two optimization results having different properties in accordance with the switching instruction from the attitude optimization control unit 56. In addition, the selection unit 57 may receive the output of the attitude evaluation unit 55 at the same time, and may make a selection. For example, in the configuration in which the energy optimization unit 54-1 performs general-purpose attitude optimization, and the energy optimization unit 54-2 performs optimization specially designed for a specific attitude, it is also possible to employ one of the optimization results indicated by the switching instruction when the optimization result has higher reliability as the evaluation result of the attitude evaluation unit 55, and in other cases, to employ the result of the energy optimization unit 54-1. Note that the selection unit 57 may store attitude parameters in a previous frame, and in a case where either of the evaluation results is lower than a certain threshold value, may select the attitude parameters in the previous frame, or as described above, may prompt a user for human body calibration through use of a prescribed attitude to bring a return such that correct attitude estimation can be performed again.

The selection unit 57 outputs attitude information of the selected optimization result to a later stage not shown.

Note that, in the example of FIG. 3, the restriction generation unit 51, the attitude adjustment unit 52, and the attitude evaluation unit 55 shown by dotted lines represent that a configuration in which each of them does not exist (is not used) can be taken as a variation. In addition, the example of FIG. 3 shows an example in which there are two types of algorithms for the energy optimization units 54-1 and 54-2, whilst there may be three or four types, that is, more algorithms as long as there are a plurality of algorithms.

<Example of Processing of Image Processing Device>

Figure 4:
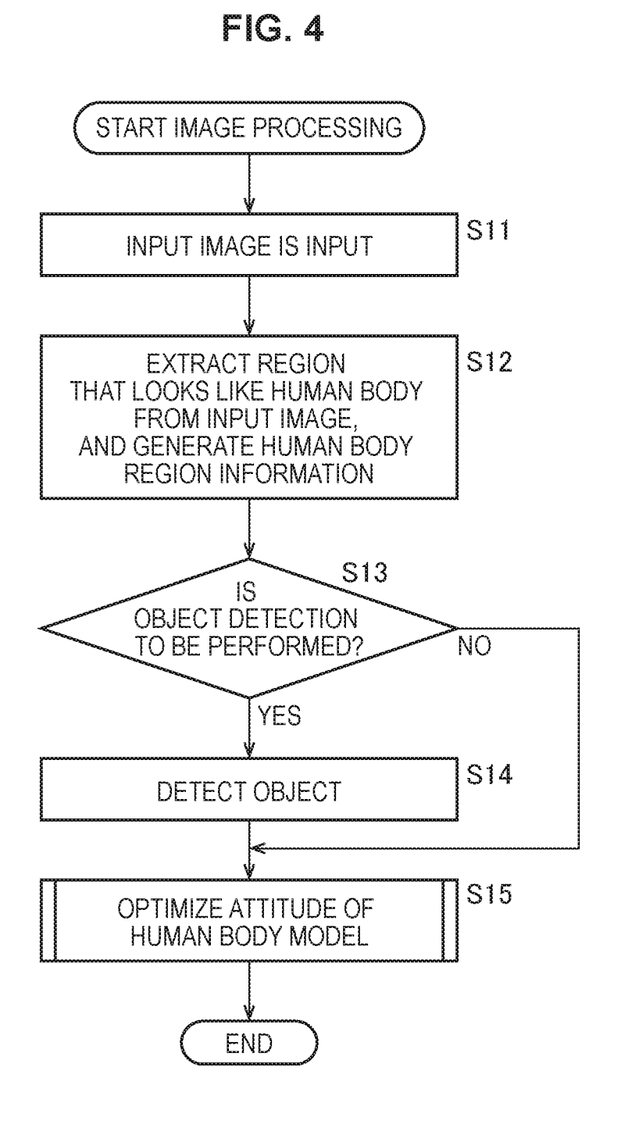
FIG. 4 is a flowchart describing image processing of the image processing device.

Next, with reference to the flowchart of FIG. 4, image processing of the image processing device 1 will be described.

In step S11, an input image is input to the human body region extraction unit 11 and the object detection unit 12 from the outside not shown.

In step S12, the human body region extraction unit 11 extracts a region that looks like a human body from the input image input in step S11, and generates human body region information. The human body region extraction unit 11 outputs the generated human body region information to the attitude optimization unit 13.

In processing in a previous frame, a detection control instruction that controls whether or not to cause object detection processing to operate has been input from the attitude optimization unit 13. In accordance with that, in step S13, the object detection unit 12 determines whether or not to perform object detection, and in a case where it is determined that object detection is to be performed, the process proceeds into processing in step S14.

In step S14, the object detection unit 12 detects an object from the input image input in step S11. The object detection unit 12 outputs the detected object position information and, according to necessity, a detection success/failure notification to the attitude optimization unit 13.

In step S13, in a case where it is determined that object detection is not to be performed, step S14 is skipped.

In step S15, the attitude optimization unit 13 optimizes an attitude of a human body model. Details of this human body attitude optimization processing will be described later with reference to FIG. 5, but in step S15, using the degree of conformity between the human body region information obtained from the input image and the silhouette of the human body model as energy, attitude parameters (the articulation position, the angle, and the number of articulations) or the like are optimized by a plurality of methods such that the energy is minimized, and a selection is made from among a plurality of optimization results in accordance with the object detection result or the degree-of-reliability evaluation result of the optimization result. Then, attitude information optimized by a plurality of methods and selected is output by the attitude optimization unit 13 to a later stage not shown, and image processing is terminated.

Next, with reference to the flowchart of FIG. 5, the human body attitude optimization processing in step S15 of FIG. 4 will be described. The human body region information from the human body region extraction unit 11 is input to the energy optimization units 54-1 and 54-2. The object position information and the detection success/failure notification which are the object detection results from the object detection unit 12 are input to the restriction generation unit 51, the attitude adjustment unit 52, and the attitude optimization control unit 56.

In step S51, the attitude optimization control unit 56 determines whether or not an object has been detected in accordance with the object detection results (object position information and detection success/failure notification) from the object detection unit 12. In step S51, in a case where it is determined that an object (for example, face) has been detected, the process proceeds into step S52.

The attitude optimization control unit 56 issues, to the selection unit 57, the switching instruction of switching to the optimization result obtained by the gradient method of the energy optimization unit 54-1, for example. In response to this, in step S52, the selection unit 57 selects the optimization result obtained by the gradient method of the energy optimization unit 54-1, and outputs attitude information of the selected optimization result to a later stage.

In step S51, in a case where it is determined that an object (for example, face) has not been detected, the process proceeds into step S53.

In step S53, the restriction generation unit 51 generates an optimization restriction for imposing a restriction condition on optimization in accordance with the object detection results from the object detection unit 12. The restriction generation unit 51 outputs the generated optimization restriction to the energy optimization units 54-1 and 54-2.

In step S54, the attitude adjustment unit 52 adjusts the attitude information (attitude parameters) at a previous time from the attitude information storage unit 53, in accordance with the object detection results and the attitude evaluation result at the previous time. The attitude adjustment unit 52 outputs the attitude information representing adjusted attitude parameters to the energy optimization units 54-1 and 54-2.

In step S55, the energy optimization unit 54-1 inputs the human body region information and the attitude information for giving an initial value of optimization, and performs optimization of parameters that determine an attitude by the gradient method, for example. The energy optimization unit 54-1 outputs the resultant optimized attitude information and degree of reliability to the attitude optimization control unit 56 and the selection unit 57.

In step S56, the energy optimization unit 54-2 inputs the human body region information and the attitude information for giving an initial value of optimization, and performs optimization of parameters that determine an attitude by a method other than the gradient method, for example, a probabilistic optimization algorithm. The energy optimization unit 54-2 outputs the resultant optimized attitude information and degree of reliability to the attitude optimization control unit 56 and the selection unit 57.

In step S57, the attitude evaluation unit 55 evaluates whether the optimization results obtained by the energy optimization units 54-1 and 54-2 are reliable, and outputs the evaluation result to the attitude adjustment unit 52, the attitude optimization control unit 56, and the selection unit 57.

In step S58, the selection unit 57 selects one of the optimization results whose degree of reliability is higher on the basis of the evaluation result from the attitude evaluation unit 55. Then, the selection unit 57 outputs attitude information of the selected optimization result to a later stage.

After step S52 or step S58, the process proceeds into step S59. In step S59, the attitude optimization control unit 56 outputs, to the object detection unit 12, the detection control instruction that controls whether or not to cause object detection processing to operate at a next time (frame) on the basis of the evaluation result from the attitude evaluation unit 55.

In the above manner, optimization of a human body attitude is performed by a plurality of optimization methods, and a selection is made in accordance with the object detection result or the degree-of-reliability evaluation result of the optimization result.

Figure 5:
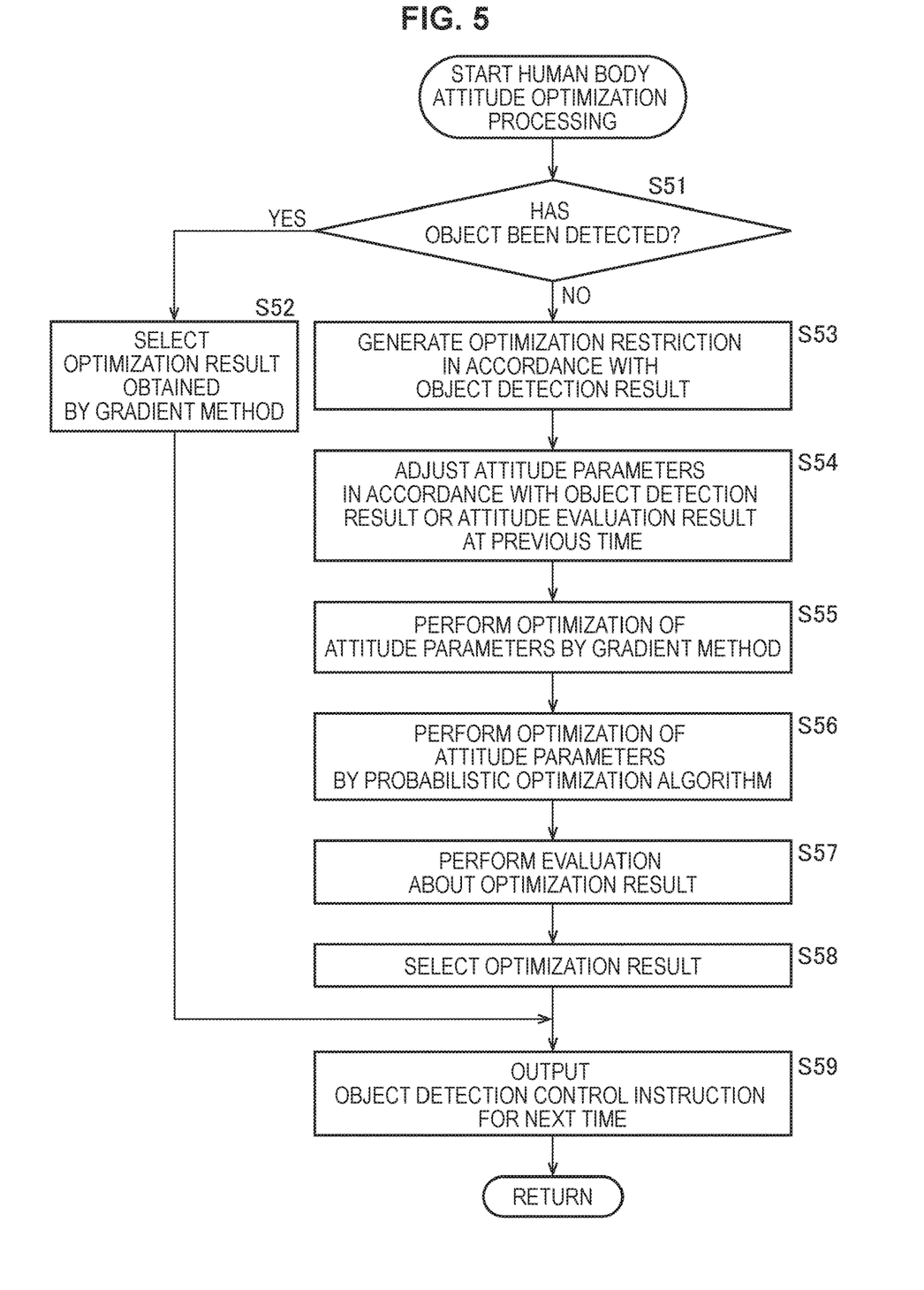
FIG. 5 is a flowchart describing human body attitude optimization processing in step S15 of FIG. 4.

Note that, in FIG. 5, steps S55 and S56 are operations performed in parallel. In addition, the example of FIG. 5 describes an example in which, in a case where an object is not detected in step S51, a plurality of the optimization results are evaluated and a selection is made, whilst in a case where an object is not detected in step S51, the selection result of the other optimization method different from the optimization method selected in step S52 may be selected.

In the above manner, in the present technology, since an optimum technique is selected from among a plurality of optimization techniques (at least one of optimization algorithm, initial value setting, and restriction) in accordance with the degree of reliability of attitude estimation, it is possible to perform more stable and highly accurate attitude estimation.

In addition, in a case where reliability of attitude estimation has decreased significantly, it is possible to bring a return to a normal state by processing such as performing calibration or alternatively requesting a user to perform calibration.

From the foregoing, according to the present technology, it is possible to perform more stable and highly accurate attitude estimation.

<Personal Computer>

A series of processes described above can be executed by hardware or by software. In a case in which a series of processing is executed by software, a program constituting the software is installed in a computer. Here, examples of the computer include a computer incorporated into dedicated hardware and a general-purpose personal computer which is capable of executing various kinds of functions in accordance with various kinds of installed programs.

Figure 6:
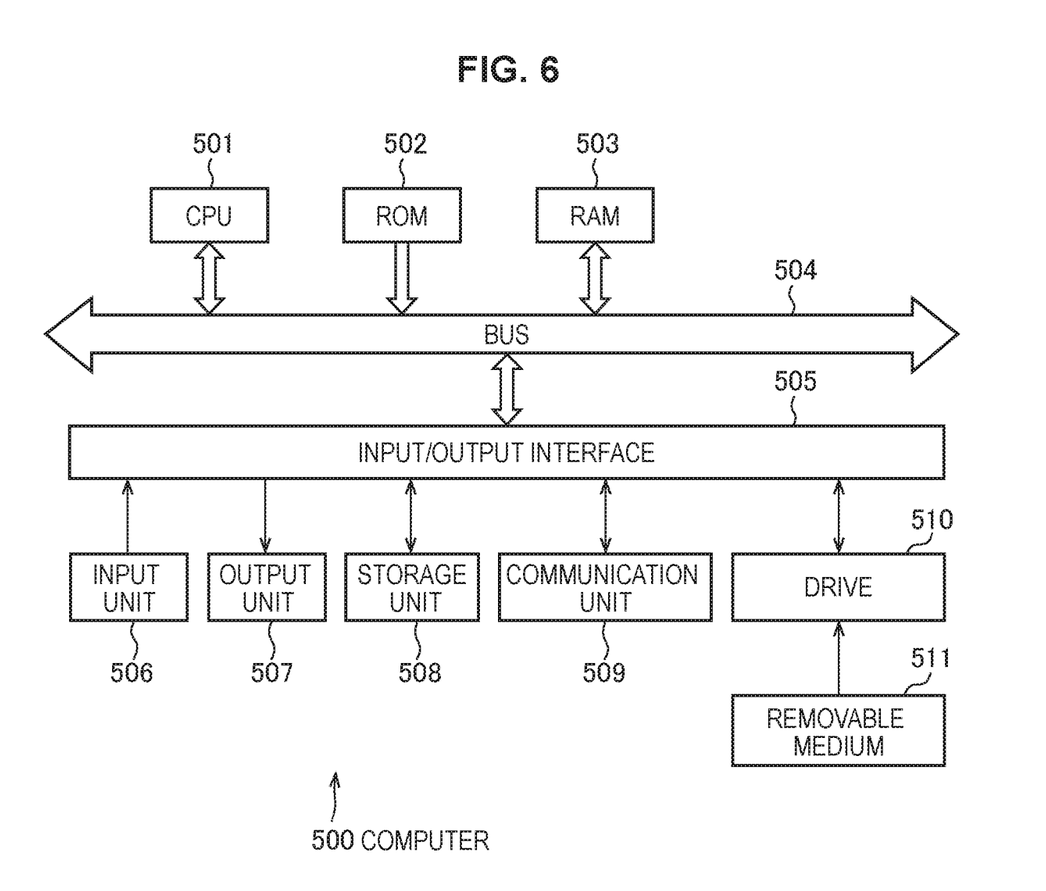
FIG. 6 is a block diagram showing a configuration example of a personal computer.

FIG. 6 is a block diagram illustrating a configuration example of hardware of a personal computer that executes a series of processes described above in accordance with a program.

In a personal computer 500, a central processing unit (CPU) 501, a read only memory (ROM) 502, and a random access memory (RAM) 503 are connected to one another via a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, or the like. The output unit 507 includes a display, a speaker, or the like. The storage unit 508 includes a hard disk, a nonvolatile memory, or the like. The communication unit 509 includes a network interface or the like. The drive 510 drives a removable medium 511 such as a magnetic disk, an optical disk, a magneto optical disk, or a semiconductor memory.

In the personal computer 500 configured as described above, for example, the CPU 501 loads a program stored in the storage unit 508 onto the RAM 503 via the input/output interface 505 and the bus 504 and executes the program. Accordingly, a series of processes described above is performed.

The program executed by the computer (CPU 501) can be recorded in the removable medium 511 and provided. For example, the removable medium 511 is a package medium including a magnetic disk (including a flexible disk), an optical disk (a compact disc-read only memory (CD-ROM), a digital versatile disc (DVD), or the like), a magneto optical disk, a semiconductor memory, or the like. Further, alternatively, the program may be provided via a wired or wireless transmission medium such as a local area network, the Internet, or digital satellite broadcasting.

In the computer, the removable medium 511 may be loaded into the drive 510, and the program may be installed in the storage unit 508 via the input/output interface 505. Further, the program may be received by the communication unit 509 via a wired or wireless transmission medium and installed in the storage unit 508. Furthermore, the program may be installed in the ROM 502 or the storage unit 508 in advance.

Note that the program executed by the computer may be a program in which processes are carried out in a time series in the order described in this specification or may be a program in which processes are carried out in parallel or at necessary timings, such as when the processes are called.

Further, in this specification, steps in which the program to be recorded in the recording medium is written do not necessarily have to be performed in time series in line with the order of the steps, and instead may include processing that is performed in parallel or individually.

Further, in this specification, "system" refers to a whole device including a plurality of devices.

Not that an embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, an element described as a single device (or a processing unit) above may be divided and configured as a plurality of devices (or processing units). On the contrary, elements described as a plurality of devices (or processing units) above may be configured collectively as a single device (or a processing unit). Further, an element other than those described above may be added to each device (or a processing unit). Furthermore, a part of an element of a given device (or a processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An image processing device including:
  a first attitude optimization unit configured to, with respect to a human body region extracted from an input image, optimize an attitude parameter of a human body model by using a first optimization technique;
  a second attitude optimization unit configured to, with respect to the human body region, optimize the attitude parameter of the human body model by using a second optimization technique different from the first optimization technique; and
  a selection unit configured to select one of a first optimization result obtained by the first optimization technique and a second optimization result obtained by the second optimization technique.

(2)

The image processing device according to (1), further including:
  an object detection unit configured to detect an object from the input image, in which
  the selection unit selects one of the first optimization result and the second optimization result in accordance with an object detection result obtained by the object detection unit.

(3)

The image processing device according to (1), further including:
  a degree-of-reliability evaluation unit configured to evaluate a degree of reliability of the first optimization result and a degree of reliability of the second optimization result, in which
  the selection unit selects one of the first optimization result and the second optimization result in accordance with a degree-of-reliability evaluation result obtained by the degree-of-reliability evaluation unit.

(4)

The image processing device according to (3), in which
  in a case where the degrees of reliability of both of the optimization results are lower than a threshold value, the selection unit selects an attitude parameter in an initial state.

(5)

The image processing device according to (3), in which
  in a case where the degrees of reliability of both of the optimization results are lower than a threshold value, the selection unit suspends processing using the first optimization technique and the second optimization technique, and prompts a user to perform calibration.

(6)

The image processing device according to any of (1) to (5), in which
  the first optimization technique and the second optimization technique relate to at least one of an algorithm, an initial value, and a restriction condition.

(7)

The image processing device according to any of (1) to (6), in which
  one of the first optimization technique and the second optimization technique is a technique based on an extremum seeking algorithm.

(8)

The image processing device according to any of (1) to (7), in which
  one of the first optimization technique and the second optimization technique is a technique based on a specific attitude or a specific action.

(9)

The image processing device according to (1), further including:
  an object detection unit configured to detect an object from the input image, in which
  one of the first optimization technique and the second optimization technique performs optimization using an optimization result in a previous frame as
  an initial value, and the other of the first optimization technique and the second optimization technique performs optimization using an initial value determined on a basis of an object detection result obtained by the object detection unit.

(10)

The image processing device according to (1), further including:
  an object detection unit configured to detect an object from the input image, in which
  one of the first optimization technique and the second optimization technique performs optimization using a restriction determined on a basis of an object detection result obtained by the object detection unit.

(11)

The image processing device according to any of (1) to (11), in which
  the attitude parameter of the human body model includes an articulation position, an angle, and a number of articulations.

(12)

An image processing image method including, by a processing device:
  optimizing an attitude parameter of a human body model by using a first optimization technique, with respect to a human body region extracted from an input image;
  optimizing the attitude parameter of the human body model by using a second optimization technique different from the first optimization technique, with respect to the human body region; and
  selecting one of a first optimization result obtained by the first optimization technique and a second optimization result obtained by the second optimization technique.

REFERENCE SIGNS LIST

1 image processing device
11 human body region extraction unit
12 object detection unit
13 attitude optimization unit
51 restriction generation unit 52 attitude adjustment unit
53 attitude information storage unit
54-1, 54-2 energy optimization unit
55 attitude evaluation unit
56 attitude optimization control unit
57 selection unit

The invention claimed is:

1. An image processing device comprising:
a first attitude optimization unit configured to, with respect to a human body region extracted from an input image, optimize an attitude parameter of a human body model by using a first optimization technique;
a second attitude optimization unit configured to, with respect to the human body region, optimize the attitude parameter of the human body model by using a second optimization technique different from the first optimization technique; and
a selection unit configured to select one of a first optimization result obtained by the first optimization technique and a second optimization result obtained by the second optimization technique; and
an object detection unit configured to detect an object from the input image, wherein
the selection unit selects one of the first optimization result and the second optimization result in accordance with an object detection result obtained by the object detection unit.

2. The image processing device according to claim 1, wherein
the first optimization technique and the second optimization technique relate to at least one of an algorithm, an initial value, and a restriction condition.

3. The image processing device according to claim 1, wherein
one of the first optimization technique and the second optimization technique is a technique based on an extremum seeking algorithm.

4. The image processing device according to claim 1, wherein
one of the first optimization technique and the second optimization technique is a technique based on a specific attitude or a specific action.

5. An image processing device comprising:
a first attitude optimization unit configured to, with respect to a human body region extracted from an input image, optimize an attitude parameter of a human body model by using a first optimization technique;
a second attitude optimization unit configured to, with respect to the human body region, optimize the attitude parameter of the human body model by using a second optimization technique different from the first optimization technique;
a selection unit configured to select one of a first optimization result obtained by the first optimization technique and a second optimization result obtained by the second optimization technique; and
a degree-of-reliability evaluation unit configured to evaluate a degree of reliability of the first optimization result and a degree of reliability of the second optimization result, wherein
the selection unit selects one of the first optimization result and the second optimization result in accordance with a degree-of-reliability evaluation result obtained by the degree-of-reliability evaluation unit.

6. The image processing device according to claim 5, wherein
in a case where the degrees of reliability of both of the optimization results are lower than a threshold value, the selection unit selects an attitude parameter in an initial state.

7. The image processing device according to claim 5, wherein
in a case where the degrees of reliability of both of the optimization results are lower than a threshold value, the selection unit suspends processing using the first optimization technique and the second optimization technique, and prompts a user to perform calibration.

8. An image processing device comprising:
a first attitude optimization unit configured to, with respect to a human body region extracted from an input image, optimize an attitude parameter of a human body model by using a first optimization technique;
a second attitude optimization unit configured to, with respect to the human body region, optimize the attitude parameter of the human body model by using a second optimization technique different from the first optimization technique;
a selection unit configured to select one of a first optimization result obtained by the first optimization technique and a second optimization result obtained by the second optimization technique; and
an object detection unit configured to detect an object from the input image, wherein
one of the first optimization technique and the second optimization technique performs optimization using an optimization result in a previous frame as an initial value, and the other of the first optimization technique and the second optimization technique performs optimization using an initial value determined on a basis of an object detection result obtained by the object detection unit.

9. An image processing device comprising:
a first attitude optimization unit configured to, with respect to a human body region extracted from an input image, optimize an attitude parameter of a human body model by using a first optimization technique;
a second attitude optimization unit configured to, with respect to the human body region, optimize the attitude parameter of the human body model by using a second optimization technique different from the first optimization technique;
a selection unit configured to select one of a first optimization result obtained by the first optimization technique and a second optimization result obtained by the second optimization technique; and
an object detection unit configured to detect an object from the input image, wherein
one of the first optimization technique and the second optimization technique performs optimization using a restriction determined on a basis of an object detection result obtained by the object detection unit.

10. An image processing device comprising:
a first attitude optimization unit configured to, with respect to a human body region extracted from an input image, optimize an attitude parameter of a human body model by using a first optimization technique;
a second attitude optimization unit configured to, with respect to the human body region, optimize the attitude parameter of the human body model by using a second optimization technique different from the first optimization technique; and a selection unit configured to select one of a first optimization result obtained by the first optimization technique and a second optimization result obtained by the second optimization technique, wherein the attitude parameter of the human body model includes an articulation position, an angle, and a number of articulations.

11. An image processing method comprising:

optimizing an attitude parameter of a human body model by using a first optimization technique, with respect to a human body region extracted from an input image;

optimizing the attitude parameter of the human body model by using a second optimization technique different from the first optimization technique, with respect to the human body region;

selecting one of a first optimization result obtained by the first optimization technique and a second optimization result obtained by the second optimization technique; and detecting, by an object detection unit, an object from the input image, wherein selecting one of the first optimization result and the second optimization result is performed in accordance with an object detection result obtained by the object detection unit.

12. The image processing method according to claim 11, wherein the first optimization technique and the second optimization technique relate to at least one of an algorithm, an initial value, and a restriction condition.

13. The image processing method according to claim 11, wherein one of the first optimization technique and the second optimization technique is a technique based on an extremum seeking algorithm.

14. The image processing method according to claim 11, wherein one of the first optimization technique and the second optimization technique is a technique based on a specific attitude or a specific action.

* * * * *